United States Patent [19] [11] 3,926,864
Hodgdon, Jr. [45] Dec. 16, 1975

[54] ION EXCHANGE MEMBRANES HAVING A MACROPOROUS SURFACE AREA

[75] Inventor: Russell B. Hodgdon, Jr., Sudbury, Mass.

[73] Assignee: Ionics, Incorporated, Watertown, Mass.

[22] Filed: Feb. 20, 1973

[21] Appl. No.: 333,570

Related U.S. Application Data

[62] Division of Ser. No. 155,357, June 21, 1971, Pat. No. 3,749,655.

[52] U.S. Cl. ...... 260/2.1 E; 210/500 M; 260/2.2 R; 264/41
[51] Int. Cl.² ......................................... B01D 39/16
[58] Field of Search .......... 210/500, 321; 260/2.1 E, 260/2.5 M, 33.4, 2.2; 204/180 P, 301, 296; 264/41, 49

[56] References Cited
UNITED STATES PATENTS

| | | | |
|---|---|---|---|
| 3,450,650 | 6/1969 | Murata | 260/2.5 M |
| 3,509,078 | 4/1970 | Roubinek et al. | 260/2.1 E |
| 3,549,562 | 12/1970 | Mindick et al. | 260/2.1 E |
| 3,637,535 | 1/1972 | Corte et al. | 260/2.1 E |
| 3,709,774 | 1/1973 | Kimura | 210/500 X |

Primary Examiner—Frank A. Spear, Jr.
Attorney, Agent, or Firm—Norman E. Saliba

[57] ABSTRACT

This invention is directed to electrodialysis equipment particularly to components comprising the ion exchange membranes. These membranes are fabricated with a polymeric macroporous surface as contrasted to the prior art microporous "gel" type membranes. The macroporous membrane surface or layer lessens the tendency for membranes especially the anion selective type to foul when employed in the electrodialysis of solutions containing fouling constituents. The macroporous membranes are obtaining by polymerizing the liquid monomers in the presence of a non-polymerizable solvent pair or diluent comprised of both a "good" and a "poor" solvent, said solvent characterized with respect to the solvents ability to swell the cross-linked polymer that is formed.

11 Claims, No Drawings

ION EXCHANGE MEMBRANES HAVING A MACROPOROUS SURFACE AREA

This application is a division of Ser. No. 155,357 filed June 21, 1971, now U.S. Pat. No. 3,749,655.

This invention relates to homogeneous, highly porous, cross-linked polymeric structures having at least two dimensions in excess of one cm. and especially to ion-permselective membranes having a microporous and/or a macroporous polymeric structure, to the process of producing said membranes and to the electrochemical cell for employing the same. More particularly, the invention is directed to ion-selective membranes having at least one major face or surface comprised of a macroporous (macroreticular) resin with the remaining portions of the membrane comprised substantially of the conventional microporous gel type resin. Specifically it is directed to the prevention or overcoming of the fouling of ion-selective membranes during the electrodialysis of aqueous solutions containing large organic or inorganic molecules which normally foul conventional gel type microporous membranes.

The electrodialysis of aqueous solutions (especially those containing organic vegtable matter such as surface waters, sewage material, sugars, pharmaceuticals etc.) frequently suffer from membrane fouling which is especially noticeable with the strongly basic types of anion selective membranes which contain ion-exchange groups of quaternary ammonium, quarternary phosphonium, tertiary sulphonium etc. Fouling however is still a problem with all present day membranes even those made with resins containing weakly basic groups although not to the same extent.

These fouling substances present in the solution being electrodialyzed are evidenced during operation by a considerable increase in the resistance (voltage) of the membrane demineralizer over a period of time. This increase in electrical resistance is believed due to the precipitation, clogging and/or imbedding of the membrane surface by medium and large molecular weight organic compounds and/or insoluble salts which originate from the solution being electrodialyzed. Fouling of membranes is encountered for example especially in the electrodialysis of industrial solutions such as sugar solutions, red wine etc. which contain substantial amounts of the offending material. The fouling material becomes lodged or formed in situ within the membranes or will tenaciously cling to their surfaces thus building up a dielectric layer. Electric membrane demineralizers of the type employing ion-exchange membranes are well known in the art and are fully described in the U.S. Pat. Nos. 2,708,658, 2,826,544, 2,848,403, 3,239,442, 3,341,441 and many others.

Several prior methods of alleviating membrane fouling have been attempted with only minor degrees of success. These methods include the addition of acid to the solution to be treated, pretreatment of the solution for removal of the offending molecular or polyvalent ions as by clarification or defecation by use of charcoal, carbon, granular ion-exchange resin etc. or the periodic or cyclic reversal of the direct current employed during operation of the electrodialysis apparatus. Other methods involve removing the fouled membranes from the electrodialysis stack and treating with chemicals such as acids, salts etc. or sanding or wire brushing the surfaces of the membranes to remove the fouled layer. These latter methods of treating the membranes directly will recover them for further use until fouling again reoccurs wherein a repeat dismantling of the apparatus is again required. Eventually however the membranes are not recoverable and must be replaced.

It has now been found that the fouling of membranes under the circumstances described hereinabove may be partially overcome and alleviated by the use of ion-selective membranes having a rigid macroreticular (macroporous) structure located at least on the surface area side of the membrane which is being subjected to the fouling constituents during the electrodialysis process. The macroreticular resin has a large surface area since it is highly porous, in that it contains pore diameter sizes preferably from 500–1500 A (angstroms). The remainder of the membrane is preferably of a polymer composition comprised substantially of the conventional homogeneous gel type microporous membrane resin such as disclosed in U.S. Pat. Nos. 2,636,851, 2,730,768, 2,731,441, 2,860,091 and others having the usual pore diameter sizes from 10–30 A. Although membranes can be fabricated having a totally hommogeneous macroporous structure throughout that is pore sizes of from 500–1500 A dispersed throughout the polymer, it is preferred to employ the macroporous surface type membrane for the electrodialysis process. Such a membrane will allow only its surface to accumulate the organic foulants while the membranes interior comprised of the conventional micro-pore size resin will not develop changes in its electrical resistance, current efficiency, water content or leakage of solution therethrough. As is well known in the resin art, macroporosity can definitely be determined by the use of electron microscopy and mercury porosimetry and it is further revealed in the specific surface area of the resin as measured by nitrogen absorption.

It is therefore, the primary object of this invention to manufacture cross-linked macroporous polymeric structures measuring at least one centimeter in two dimensions for use as intermediates in the production of ion-permselective membranes of both the cation and anion type.

Another object is to make electrically conductive ion-selective membranes or sheets containing at least one surface of macroporosity with the remaining portions of the membrane having a gel type microporosity.

A further object is to utilize macroporous polymeric ion-selective membranes as hydraulic separators in electrolytic and electrodialysis equipment in the treatment of solutions containing membrane fouling constituents.

Other objects and advantages of the present invention will become apparent to one skilled in the art from the following description and appended claims.

The macroporous polymeric matrix or skeleton suitable for use as the intermediate structure in the manufacture of novel, ion-selective membranes can be prepared by copolymerizing a variety of monomers which are well known in the art under conditions that will yield a polymeric "board" structure containing at least one surface area of macroporous resin. For purposes of this disclosure a board is the sheet or film of a highly cross-linked polymeric structure prior to the introduction of ion-exchange groups therein, which groups give the polymeric resin the ability to act as an ion-permselective membrane. It will be apparent that the boards are not endowed with ion-exchange characteristics of either anion or cation charge until such ion-exchange active groups have been attached thereto. The boards, however, are the base or intermediate material from which either cation or anion-exchange membranes may be obtained by the well known chemical treatment of the same to introduce known positive or negative ion-exchange groups. Reinforcement of the board may be provided by one or more layers of a support material which is not generally subject to chemical attack such as woven glass (Fiberglas), polytetrafluoroethylene (Teflon) polypropylene, polyethylene, and the like, on which the polymer is cast. The board itself is prepared for example by copolymerizing a monomeric compound having one polymerizable double bond such as a monovinyl compound of styrene with a cross-linking monomeric compound having at least two polymerizable double bonds for example divinylbenzene. An important factor in the fabrication of the membranes of the present invention is the use of a pair of inert non-polymerizable (NP) organic solvents into which the double bond monomeric compounds are first diluted prior to the polymerization. This inert solvent pair should be present during polymerization to the extent of at least 10% by volume based on the total volume of the monomeric mixture including the solvents. Although a minimum total solvent content of about 10% has been found effective for purposes of this invention, preferred embodiments include much larger amounts between about 20–50%. Structures including as much as a total of 75% solvent have been found to be quite satisfactory. The solvent pair should comprise a "good solvent" and a "poor solvent" which terms will be more specifically defined hereinafter. During the polymerization of the monomers there is a natural tendency for the polymerizate to reject a poor solvent while dispersing a good solvent although both solvents are initially fully miscible with the starting liquid monomeric mixture. This makes possible the imparting of a macroreticular (macro-porous) surface to a polymeric board while simultaneously allowing the preparation of the conventional micropore structure to the remaining portions of the board. The monomeric mixture containing the solvent combination of at least one good solvent and at least one poor solvent is seeded with a small quantity of a polymerization catalyst such as benzoyl peroxide. The volume ratio of poor to good solvent although critical can be varied to some degree provided however that the poor solvent comprises at least about 15 to 55% of the total solvent content. Naturally the greater the surface thickness desired of the macroporous layer the more of the poor solvent required. The macroreticular layer of the polymeric board can be as small as 0.1 mil thickness to possess anti-fouling characteristics with no limit to the maximum thickness since the entire membrane can be made substantially macroporous if so desired by employing the macroporous pore forming poor solvent as the predominate solvent in total monomer diluent employed. The total membrane or board thickness should be from 1 to 100 mils (preferably 10 to 25 mils) with the macroreticular resin surface layer being preferably at least about 10% of that thickness, that is from 0.1 to 10 mils for each macroporous surface layer.

For purposes of this disclosure good solvents are those having boiling points which are higher (preferably at least 10°C higher) than the polymerization temperature employed, should be inert to the polymerization reaction (in that they do not react chemically or polymerize with the monomers) should preferably be totally miscible with the starting liquid monomers and should act as a swelling agent for the resulting solid copolymer by being absorbed or imbibed therein. The use of various good solvents for membrane fabrication is fully disclosed in U.S. Pat. Nos. 2,730,768, 2,731,441 etc. and include for example liquid aromatic hyrocarbons such as toluene, xylenes, naphthalenes, benzene, and diethylbenzene; ketones such as cyclohexanone, methyl ethyl ketone and acetone; ethers such as diethylene glycol dimethyl ether (diglym), dioxane or dichloro diethyl ether; halogenated hydrocarbons such as methylene chloride, propylene chloride, chloroform, carbon tetraachloride, dibromethane, ethylene chloride or ethylene bromide. Also suitable mixtures of good solvents in preference to a single good solvent may be employed whenever desired. Other good solvents may be used besides those specifically mentioned above which are susceptible of forming solutions of the required concentration in order to impart microporosity to the copolymer and which does not interfere with the polymerization. The volume of good solvent present during polymerization determines the percent microporosity and substantially fixes the solvent or water holding capacity or content of the resulting polymeric structure. The good solvent contained in the polymeric structure can be replaced by another solvent, and the structure will imbibe about the same volume of water or other liquid as was present as original good solvent during the polymerization reaction.

Homogeneous microporous selective membranes may be produced from a polymeric matrix structure resulting from combining a polyvinyl aromatic compound such as divinyl benzene with a monovinyl aromatic compound such as styrene or ethyl styrene diluted in a good solvent only and polymerized in the presence of a catalyst. The resulting homogeneous microporosity of the structure can be controlled somewhat by varying the quantity of the good solvent within the monomeric mixture.

A poor solvent on the other hand is one that is also chemically inert under polymerization conditions and miscible with the monomeric mixture but of greater importance it must be incompatible with the resulting polymer or copolymer, that is, failing to substantially swell or become dissolved in the polymer. The poor solvent must not exert any substantial solvent action on the copolymer or be imbibed by the copolymer.

The determination of the most effective poor solvent and the amount required for the formation of a particular surface thickness of a macroporous copolymer structure may vary from case to case. Although there is no "universal" or single class of poor solvents applicable to all cases, the requirements of solubility with the starting liquid monomeric mixture and non-solubility in the resulting solid copolymer such as polystyrene can be tested empirically. It has been experimentally determined that surface macroporosity will develop in the board structure if a minimum concentration of poor solvent be present of about 15 volume % of the total solvent concentration to effect the required phase separation. The liquid system containing the solvent pair of a good and a poor solvent remains substantially homogenous and will not separate when the poor solvent is present in small amounts, that is below the critical concentration of about 15%. The minimum concentration of poor solvent in the polymerizing mixture should be in excess of this critical concentration and this excess amount can be varied so as to modify the extent and thickness of the macroporosity of the resin surface. As the concentration of liquid monomer in the polymerizing mass decreases (due to the polymerization) and as the concentration of the resulting solid copolymer increases, the poor solvent is repelled out of the polymeric phase passing necessarily in the direction of the polymer surface where it tends to accumulate if prevented from leaving. This expulsion of the poor solvent towards the resin surface results in the formation of a structure having the larger pores (500-1500A) located towards the resin surface area with the separate and distinct micropores (10-30A) located primarily at the deeper portion of the resin, that is away from the surface. Particularly satisfactory poor solvents for preparing a macroporous copolymer such as a polymer resulting from a styrene-divinylbenzene monomeric mixture are the lower alcohols (methyl, ethyl, propyl and butyl) and certain of their isomers; also certain non-aromatic hydrocarbons solvents which includes hexane, cyclohexane, heptane, isooctane and the like as well as mixtures of the same. Also useable are the glycols such as polypropylene and polyethylene glycols or mixtures of the same, polycarboxylic acids, the lower monobasic organic acids, kerosene and the like. The use of these poor solvents will produce a macroporous polymeric structure having a whitish and opaque appearance which is characteristic of solvent rejection by the polymer phase. These resulting polymers will retain their macroporous structure even after being converted into ion-permselective membranes by well known techniques as by the introduction of cation groups such as sulfonic acid, carboxylic acid etc. or by the introduction of anion groups such as amines etc. Anion groups can be introduced for example by chloromethylating the polymeric board structure and then aminating to introduce the quarternary amonium groups. Cation groups can be introduced for example by sulfonating the board structure by reacting with a sulfonation agent such as concentrated sulfuric acid, oleum, chlorosulfonic acid etc. Other suitable ionic acidic ion exchange reactive groups (cationic) are those generally used in ion exchange reactions, e.g. phosphonic, phosphinic, thiophosphinic, arsonic and carboxy. Other suitable ionic basic ion exchange groups (anionic) also known from the art include primary, secondary or tertiary amino groups, phosphonium, tertiary sulphonium groups and the like.

The membranes may be formed by various methods but it is preferred that a polymer substrate of liquid monomers be polymerized in sheet form between confining glass plates and then post-treated to introduce cation or anion exchange groups as the case may be. Of course the post treatment is not necessary where the monomer employed is already in the exchange group forms as where the monomers themselves contain cation groups such as vinylsulfonic acid or methyl styrene vinyl phosphoric acid and the like. The macroporous surface boards are preferably formed on reinforcing or supporting sheet fabrics by placing one or more sheets on a flat bottom casting surface on top of one another. The mixture of the good and poor solvent pair and the polymerizable monomeric components or partially polymerized components are poured over the support material, covered with a flat top casting surface and then mass-heated until polymerization is complete. For example the monomer mixture may be poured into a rectangular tank into which glass plates and a reinforcing web or mat of an inert material such as glass cloth, polypropylene etc. is alternately placed in a stack arrangement and totally covered with the monomeric-solvent mixture. Thus there is between each pair of smooth glass plates a reinforcing sheet material completely saturated with the monomeric liquid mix. Thus the parallel glass plates are spaced from each for a distance substantially equal to the thickness of the reinforcing sheet. The tray is then heated and the liquid mixture allowed to polymerize. During the polymerization process the poor solvent in the mix is rejected by the forming polymer (phase separation) but being unable to escape the glass barrier it will preferentially and out of necessity locate itself at the general interface area between the glass plate and the polymer adjacent thereto.

The polymer matrix or board which acts as the skeleton for the various functional exchange groups of the novel macroporous membrane of the present invention are preferably based upon a styrene-divinylbenzene copolymer and may be varied as to their chemical structure over a considerable range as is well known in the art of making membranes. For example the monovinyl aromatic hydrocarbon monomeric component of the board structure can be employed individually or as mixtures and may be styrene (vinyl benzene) or its nuclear and/or alpha substituted derivatives such as ethyl vinyl benzene (ethyl styrene), vinyl toluene (methyl styrene) and its isomers, such as isopropyl styrene, also chlorostyrenes, paramethylstyrene, cyanostyrene, methoxylstyrene, acetyl styrene, dimethylstyrene and the like.

The polyvinyl aromatic monomer which furnishes the cross linking groups to produce an insoluble resin may comprise divinyl benzene (DVB), and substituted derivatives thereof such as the nuclear and/or alpha substituted derivatives such as, divinyl toluene, dimethyl divinyl benzene, dimethyl divinyl toluene, and the like, Also useful are trivinyl-benzene, trivinylnapthalene, ethyl acrylate, vinyl acetate, etc. The divinyl benzene of commerce usually contains a large fraction of ethyl vinyl benzene (a non cross-linking agent) and also a small amount of non-polymerizable solvent of diethyl benzene. The highest divinyl benzene content of todays commercial product is about 72% but this is expensive and difficult to obtain, therefore necessitating the use of the more readily available 50–60% DVB. The amount of the cross-linking agent employed may vary within wide limits from 20–80 mole % of the total polymerized monomers in the membrane resin phase with the preferable range being between 25–50 mole %.

The copolymerization of the monomers is accelerated by means of well recognized catalysts such as organic peroxide compounds (benzoyl peroxide being the preferred reagent for this invention) azo catalysts and the so called redox "free radical" catalysts such as perborates and persulfates which are suitably activated by appropraite reducing species. The monomers may also be suitable co-polymerized by the well known art of irradiation whether the source is light or the more effective gamma radiation waves.

Having described the invention is general terms, the following examples will more particularly illustrate the invention.

EXAMPLE I (Totally Macroreticular Membrane)

| | |
|---|---|
| 55% Divinylbenzene | 396 ml. (contained 12 ml. of diethylbenzene) |
| Styrene (B.P. = 145°C) | 117 ml. |
| Diethylbenzene (B.P. = 181–184°C) | 97 ml. |
| Iso-Butyl Alcohol (B.P. = 108°C) | 390 ml. |
| Benzoyl Peroxide | 4.7 grams |

The above clear liquid monomeric mixture is placed into a 3 inches deep polymerization tray having dimensions of 12 × 10 ½ inches and alternately sheets of glass plates (9 × 9 inches) and woven Dynel (T.M.) cloth (0.055 cm. thick) are stacked into the mixture (sandwich style) until a total of nine pieces of glass plates alternated with eight pieces of cloth. This tray, with its contents are placed into an explosion proof oven overnight with an initial oven temperature setting of 60°C rising to 75°C over the first three hours and then maintaining a polymerization temperature of 75°C for the balance of a 15 hour period.

At the end of the polymerization period, the solid mass of polymer is released from the tray and after cooling, the glass plates are removed one at a time with concurrent release of the cast polymeric boards which are comprised of bulk polymer encasing the cloth fabric to form a reinforced sheet structure.

The boards are immersed in diethyl benzene and are white and very opaque in appearance in contrast to the clear gel type (non-macroreticular) boards or membranes described heretofore in Clarke U.S. Pat. Nos. 2,730,768 and 2,731,441. The opaque appearance throughout is indicative of a substantially totally macroreticular resin structure.

A. Anion Exchange Membranes

Four of the above resulting boards are placed into ethylene dichloride for an overnight period. After this resin swelling step, they are immersed (by suspension) in a 6 liter tank containing a solution made up of 4 liters of chloromethyl ether, 1 liter of ethylene dichloride, and 0.54 pounds of anhydrous ferric chloride. This chloromethylation reaction is carried out overnight. The chloromethylated boards are then rinsed in methyl alcohol (or ethylene dichloride) and placed overnight into a solution containing about 25% by volume or trimethylamine in water. The resulting aminated boards are removed from the trimethylamine, placed in 1N HCl bath, washed with tap water to remove amine hydrochloride salts and then exchanged in 2N NaCl solution followed by a thorough rinse with tap water to remove residual sodium chloride salts.

The resistivity of three small samples of the resulting anion membranes is determined at 1000 cycles in 0.01 N NaCl to give an average resistivity of 43.2 ohm-cm$^2$. This value is more than double the normal values of the prior art gel type membranes of similar formulation. The transport number of the membranes when measured in a concentration cell (0.1N NaCl vs. 0.05 N NaCl) is found to be 0.744 which is substantially lower than the usual gel type membrane values of 0.95–0.98.

EXAMPLE II (Surface Macroreticular Membranes)

| | |
|---|---|
| 55% Divinylbenzene | 352 ml. (contained 18 ml. of DEB) |
| Styrene | 116 ml. |
| Ethyl Alcohol | 200 ml. (B.P. = 78.5°C) |
| Diethylbenzene (DEB) | 332 ml. |
| Benzoyl Peroxide | 4.5 grams |

The above clear liquid mixture is placed into a polymerization tray with glass plates and sheets of woven Dynel cloth and polymerized as in Example I. The glass plates are then removed one at a time with concurrent release of the finished membranes. It is noted (and easily identified by odor and water solubility test) that the poor solvent of ethyl alcohol has collected at the surfaces of the glass casting plates. Thus the poor solvent is generally located at the surfaces of each resulting macroporous surface board structure.

The resulting boards are immersed in diethylbenzene and are noted to be opaque in surface appearance in contrast to the clear gel type (non-macroreticular) membranes. The boards having a macroporous opaque surface area and a clear gel type center are then chloromethylated and aminated to form anion exchange membranes as previously described.

In Example I where 78% of the non-polymerizable solvent used is the poor solvent of isobutyl alcohol, the membrane opaqueness is evidenced substantially throughout the board structure. However, in this Example II the macroreticular character of the board is located at the surfaces only thus its transport number of 0.85 is much higher than the value found for the totally macroreticular anion membrane structure of Example I.

Thus, unlike the totally macroreticular ion exchange membranes this membrane has a gel type resin center, that is a center polymerized in the presence of a non-volatile, good solvent and having pore sizes of between about 10–30 angstrom diameter and resin surfaces forced to polymerized in the presence of a volatile, poor solvent forming pore diameters in the range of about 500–1500 angstrom units.

These surface opaque anion membranes gave a resistivity of 26.6 ohm-cm$^2$. This compares to a resistivity of 16–18 ohm-cm$^2$ for a corresponding totally gel type membrane of the same formulation using a preponderence of good solvent as the non-polymerizable diluent.

EXAMPLE III

The same method of membrane fabrication is carried out as in Example II, except the more volatile methyl alcohol is used as the poor solvent in substitution for iso-butyl alcohol. It had previously been determined, that if the temperature of polmyerization exceeded the boiling point of the poor solvent, the resulting membranes would have large bubbles at or near their surfaces thus the polymerization temperature was kept between 55° and 60°C.

Formulation

| | |
|---|---|
| 55% Divinylbenzene | 405 ml. (contains 20 ml. of DEB) |
| Styrene | 100 ml. |
| Diethylbenzene (good solvent) | 330 ml. |

| | |
|---|---|
| Methyl Alcohol (Poor solvent) | 165 ml. (B.P. = 64.7°C) |
| Benzoyl Peroxide | 13.5 grams |

The resulting boards are chloromethylated and aminated as previously described to produce anion membranes having a resistivity of 31 ohm-cm², the usual thickness of 0.055 cm, and an anion transport no. of 0.85. The high resistance of these novel surface macroreticular membranes as compared to the gel type membranes of the same formulation (usually 16–18 ohm-cm²) is a further indication of a macroreticular membrane structure whose surfaces contain essentially all large pore type resin with a central or inner portion somewhere between the macro and microporous structure. As in the case of the surface macroreticular membranes of Example II these membranes also possessed the opaque surface appearance and were not optically clear.

EXAMPLE IV

The same method of membrane fabrication is carried out as in Example II except that a high boiling sec-butyl alcohol is used as the poor solvent of the non-polymerizable solvent mixture with polymerization carried out at 65°–90°C. The volume percent of poor solvent in the total volume of non-polymerizable components of the bulk polymer mixture is about 20%.

Formulation

| | |
|---|---|
| 55% Divinylbenzene | 405 ml. (contains 20 ml of diethylbenzene) |
| Styrene | 100 ml. |
| Diethylbenzene | 396 ml. |
| Sec-Butyl Alcohol | 104 ml. (B.P. 99.5°C) |
| Benzoyl Peroxide | 4.5 grams |

The resulting boards are chloromethylated and aminated as previously described.

Properties

| | | |
|---|---|---|
| Resistivity | = | 27.1 ohm-cm² |
| Transport Number | = | 0.83 |
| Appearance | = | Hazy surface but with enough clarity to still see through membrane |

The higher resistivity of these membranes as compared to the gel type membrane of the same formulation and the lower transport number and hazy appearance show them to be definitively, surface macroreticular membranes.

The surfaces of these membrane are sand papered to remove the hazy surface resin almost to the supporting cloth. Its resistivity decreased substantially and measured 20.7 ohm-cm² proving quite conclusively, by geometrics, that most of the membrane's macroreticular character is located at or near the surface planes.

EXAMPLE V

This example of membrane preparation is identical to Example IV, except that the volume percentage of poor solvent in the total volume of non-polymerizable components of the polymerization mixture was reduced further to about 15%.

Formulation

| | |
|---|---|
| 55% Divinylbenzene | 405 ml. (contains 20 ml. of diethylbenzene) |
| Styrene | 100 ml. |
| Sec-Butyl Alcohol | 78 ml. |
| Diethylbenzene | 422 ml. |
| Benzoyl Peroxide | 4.5 gms. |

Properties

| | |
|---|---|
| Resistivity | 21.0 ohm-cm² |
| Transport Number | 0.94 |
| Appearance | Only a very slight hazy surface and clear enough to easily see directly through membrane. |

This example proves by the resulting physical and measured characteristics that membranes can still be made having a slight macroreticular surface when the volume percentage of poor solvent is down to only about 15% of the total volume of poor and good solvents employed in the bulk polymerization mixture.

EXAMPLE VI

The same method of membrane fabrication is carried out as in Example II except that 96.5% volume of poor solvent (Octanoic acid) is used in the total volume of non-polymerizable components.

Formulation

| | |
|---|---|
| 55% Divinylbenzene | 405 ml. (20 ml. of DEB) |
| Styrene | 100 ml. |
| Octanoic Acid (n-caprilic acid) | 500 ml. (B.P. =239 °C) |
| Benzoyl Peroxide | 4.5 grams |

The polymerization temperature is 65°–80°C with chloromethylation and amination as described in Example II.

Properties

| | | |
|---|---|---|
| Resistivity | = | 49.2 ohm-cm² |
| Anion Transport | = | 0.788 |
| Appearance | = | Totally Opaque Throughout |

In this case a totally homogeneous macroreticular membrane resulted since essentially all of its non-polymerizable solvent is in the form of the poor solvent. A high resistivity and low transport number is noted for membranes prepared with substantially greater than 50% of its non-polymerizable portion as poor solvent.

EXAMPLE VII

These membranes are prepared in the same general manner as Example I with the temperature of polymerization between 65°–80°C.

Formulation

| | | |
|---|---|---|
| 55% Divinylbenzene | = | 405 ml. (contains 20 ml. diethylbenzene) |
| Styrene | = | 100 ml. |
| Iso-Butyl Alcohol | = | 260 ml. |
| Diethylbenzene | = | 240 ml. |
| Benzoyl Peroxide | = | 4.5 grams |

Properties

| | |
|---|---|
| Resistivity | 38.4 ohm-cm$^2$ |
| Anion Transport Number | 0.80 |
| Appearance | Opaque |

The transport number is higher than the totally macroreticular membranes which indicates that only surface macroreticularity has been achieved i.e. the center of the membrane still contains some gel form resin.

The following table summarizes the results of the previously described examples.

| Example No. | % Volume of Poor Solvent in Total Volume of Non-Polymerizable Solvent | Resistivity Ohm-cm$^2$ 0.01 N NaCl | Anion Transport Number (0.1N NaCl vs. 0.05N NaCl) |
|---|---|---|---|
| 6 | 96.5 | 49.2 | 0.788 |
| 1 | 78.0 | 43.2 | 0.744 |
| 7 | 50.0 | 38.4 | 0.80 |
| 2 | 36.5 | 26.6 | 0.85 |
| 3 | 32.5 | 31.0 | 0.85 |
| 4 | 20.0 | 27.1 | 0.83 |
| 5 | 15.0 | 21.0 | 0.94 |
| standard "gel" type | 0.0 | 16.0 – 18.0 | 0.95 – 0.98 |

It has been further shown by laboratory experimentation including the examples herein described that surface macroreticular membranes may be prepared only where there is no less than a minimum of about 15% by volume of poor solvent present in the total volume of inert non-polymerizable solvent up to a maximum not much greater than about 55% by volume of poor solvent. At below the 15% volume figure a substantially gel type membrane throughout is obtained offering no effective surface pore diameter increase and hence little resistance to membrane fouling. At much above the 55% volume level there is obtained a substantially total homogeneous macroreticular membrane whose surfaces and center are essentially indistinguishable as to porosity characteristics. Within the 15 to 55% range surface macroreticular membranes will be produced having resistivity measurements between about 20–40 ohm-cm$^2$ and anion transport numbers between about 0.80–0.94. These membranes will not only possess a non-fouling, highly porous surface but will additionally retain the desirable characteristic of a center or inner resin portion of the gel type microporous structure.

The embodiments of this invention in which an exclusive property or privilege is claimed are defined as follows:

1. A method of preparing a substantially insoluble cross-linked, polymeric non-laminated, one piece board suitable for the manufacture of ion-selective membranes, the boards having at least two dimensions in excess of one centimeter with both major surfaces having a macroporous structure of pore diameter sizes between about 500–1500 angstroms with the interior portion of said board substantially comprising a microporous structure having pore diameter sizes in the range of about 10–30 angstroms, the method comprising preparing a monomeric mixture of at least one monovinyl aromatic monomer and at least one polyvinyl aromatic cross-linking monomer, said cross-linking compound being present between about 20–80 mole % of the total polymerizable monomers of said mixture, said mixture further containing dissolved therein between about 15 to 75% by volume of an inert, non-polymerizable, organic solvent pair, said solvent pair comprising at least one good solvent and at least one poor solvent and polymerizing said monomeric mixture under conditions to substantially prevent the escape of said poor solvent from the monomer mixture during the formation of said polymerized board structure, said poor solvent being present in an amount of between about 15 to 55% by volume based on the total volume of said solvent pair.

2. The method of claim 1 wherein the said poor solvent is selected from the group consisting of the lower alcohols, the isomers of the lower alcohols, polypropylene glycol, polyethylene glycol, isooctane and mixture of the same.

3. The method of claim 1 wherein said monovinyl aromatic monomer is selected from the group consisting of styrene, ethyl styrene, methyl styrene and mixtures thereof, said polyvinyl aromatic monomer selected from the group consisting of divinyl benzene, ethylene glycol dimethacrylate, divinyl toluene, trivinylbenzene and mixtures thereof, the said volume of the non-polymerizable solvent pair being between 20–50% and the said cross-linking monomer being polymerized in an amount equal to about 25 to 50% on a molar basis of the total polymerizable monomers.

4. The method of claim 1 wherein, the monovinyl monomer is ethyl styrene, the cross-linking monomer is divinyl benzene and wherein the resulting cross-linked polymerized board structure is treated by chloromethylation and amination whereby there is bonded to the aromatic nuclei of said monomers, quaternary ammonium groups.

5. A substantially insoluble, cross-linked, polyvinyl, polymeric non-laminated, one piece resin sheet suitable for the manufacture of ion-selective membranes, the sheet having at least two dimensions in excess of one centimeter, said sheet comprising a copolymer of at least one monovinyl aromatic monomer and at least one polyvinyl aromatic cross-linking monomer of which both major surfaces of said polymeric sheet is of a macroporous structure having pore diameter sizes between about 500–1500 angstroms with the remaining interior portion of said sheet substantially comprising the microporous structure having a pore diameter size in the range of about 10–30 angstroms.

6. The polymeric sheet of claim 5 wherein each macroporous surface or layer has a thickness between about 0.1 to 10 mils.

7. The polymeric sheet of claim 5 wherein there is bonded to the said aromatic nuclei of the said monomers, quarternary ammonium groups to form an anion permselective membrane.

8. The anion membrane of claim 7 characterized by a resistivity between about 20–40 ohm-cm$^2$. and an anion transport number between about 0.80–0.94.

9. The polymeric resin sheet of claim 5 characterized by carrying the ion-exchange reactive group selected from the groups consisting of primary, secondary or tertiary amine, quaternary ammonium, phosphonium, tertiary sulphonium, sulfonic, phosphonic, carboxy, phosphinic, thiophosphonic, arsonic groups and mixture thereof.

10. The polymeric sheet of claim 5 wherein there is bonded to the said aromatic nuclei of the said monomers, sulfonic acid groups to form a cation permselective membrane.

11. An anion permselective non-laminated, one piece membrane comprising a substantially, insoluble, cross-linked polyvinyl aromatic polymer having both major surfaces of a macroporous structure having pore diameter sizes between about 500–1500 angstroms and the remaining inner portions of the membrane of a microporous structure having pore diameter sizes between about 10–30 angstroms, said membrane possessing a resistivity of between about 20–40 ohm-cm$^2$ and a transport number between about 0.80–0.94, said macroporous and microporous structure caused by the polymer having been prepared in the presence of a solvent pair comprising a good and a poor solvent wherein the poor solvent comprised between about 15–55% by volume of the total volume of the solvent pair.

* * * * *